April 28, 1925.
C. C. HANSON ET AL
1,535,998
STUFFING BOX
Filed June 13, 1921
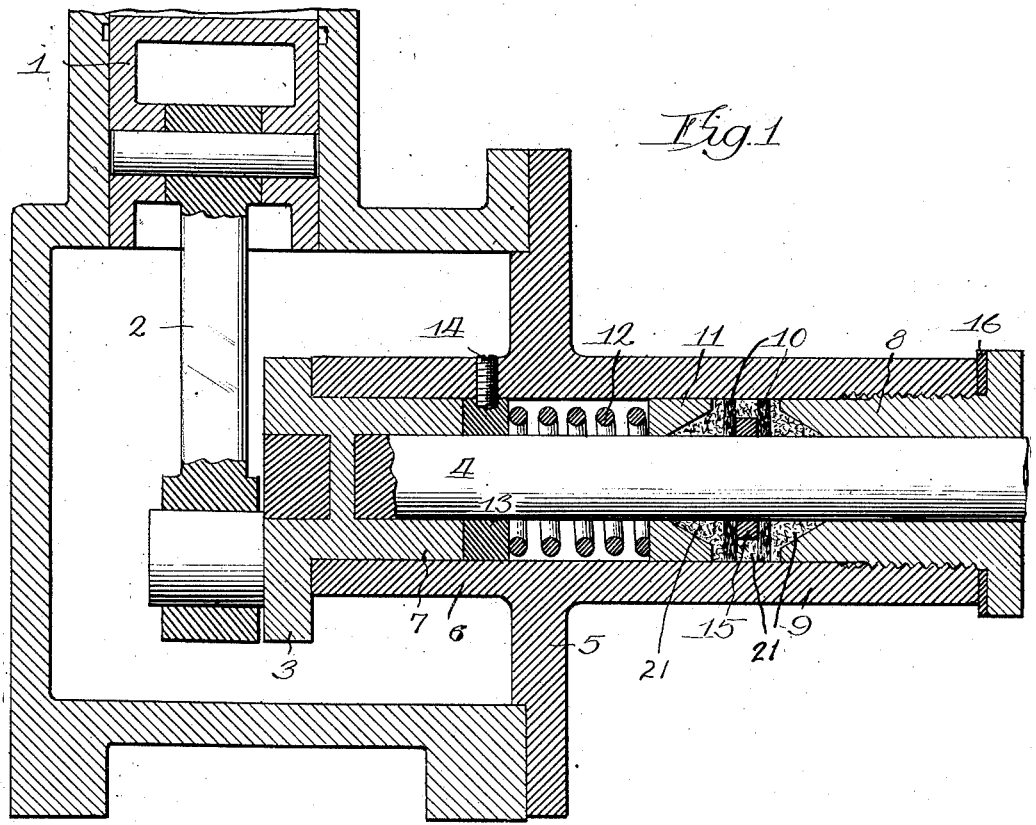
*Fig.1*
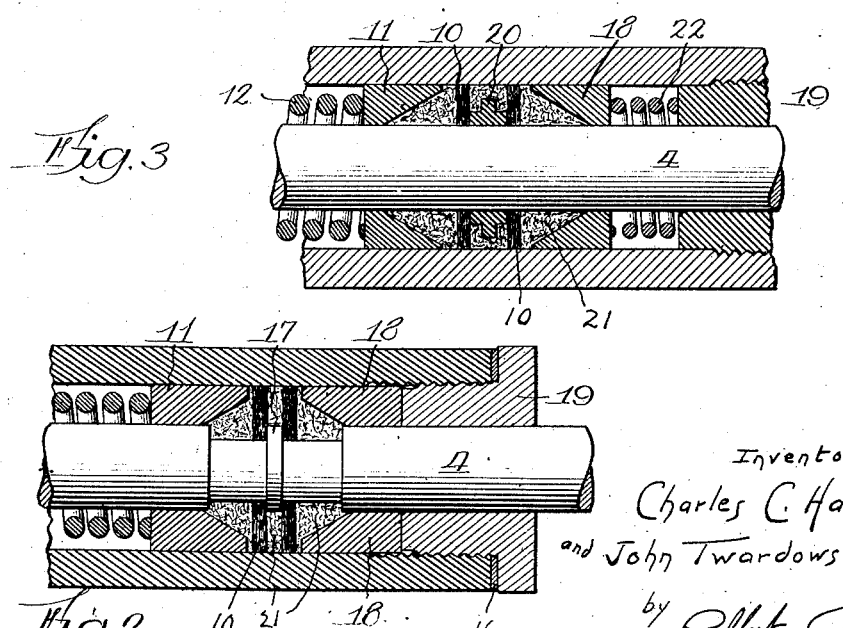
Inventors:
Charles C. Hanson
and John Twardowsky
by Albert Scheible
Attorney Patented Apr. 28, 1925.

1,535,998

UNITED STATES PATENT OFFICE.

CHARLES C. HANSON AND JOHN TWARDOWSKY, OF CHICAGO, ILLINOIS, ASSIGNORS, BY MESNE ASSIGNMENTS, TO UNIVERSE CORPORATION, OF CHICAGO, ILLINOIS, A CORPORATION OF ILLINOIS.

STUFFING BOX.

Application filed June 13, 1921. Serial No. 477,252.

*To all whom it may concern:*

Be it known that we, CHARLES C. HANSON, a citizen of the United States, and JOHN TWARDOWSKY, a citizen of Russia, both residing at Chicago, in the county of Cook and State of Illinois, have invented certain new and useful Improvements in a Stuffing Box; and we do hereby declare the following to be a full, clear, and exact description of the invention, such as will enable others skilled in the art to which it appertains to make and use the same.

Our invention relates to stuffing boxes as used in connection with the bearings of rotating or oscillating shafts, its general object being that of providing a tight and self-adjusting closure around such a shaft without involving an undesirable amount of friction.

Where a shaft is used under conditions producing decided differences in pressure at the opposite ends of a bearing for the shaft, this pressure difference will continuously tend to produce a leakage along the shaft, and the ordinary packing arrangements employed in stuffing boxes are inadequate for retarding such a leakage unless the packing is maintained under so great a pressure against the shaft as will afford a large amount of friction. Moreover, the ordinary packing box arrangements grow to be less and less adequate for the retarding of such leakage when the packing is gradually compacted by the pressure on the same and by the vibration of the machine of which the shaft forms a part. Moreover, it is usually difficult even for an experienced mechanic to estimate the proper amount of the required packing with any high degree of exactness, while an inexperienced attendant may guess still farther out of the way, the result being either that of leaving the bearing inadequately packed, or of having it so tightly packed as to produce an undue amount of friction and wear.

Our invention aims to overcome these objections by providing a stuffing box arrangement which will automatically compensate both for variations from the adequate amount of the packing as initially introduced, for variations in the compressibility of different kinds or grades of packing, and for variations in the extent to which the packing is gradually compressed during the continued operation of the machine of which the stuffing box forms a part. It also aims to provide a shaft and stuffing box arrangement which will prevent leakage along the shaft in spite of vibrations transverse of the shaft. Furthermore, our invention aims to provide a packing arrangement for a shaft, in which one of the bearing portions for the shaft cooperates in affording the said automatic adjustments. It also aims to provide a shaft construction particularly adapted for affording such a self-adjusting packing, and aims to provide a stuffing box arrangement which may be employed with substantially equal facility with little or no machining of the shaft. Moreover, our invention aims to provide simple means to compensate for such end thrust as may be produced on the shaft by the gradual compacting and wearing of the packing. Still further and also more detailed objects will appear from the following specification and from the accompanying drawings, in which Fig. 1 is a fragmentary central and longitudinal section through an air compressor equipped with a stuffing box embodying our invention and showing an arrangement in which a packing-engaging collar is shrunk upon an ungrooved shaft, some portions being shown in elevation.

Fig. 2 is a longitudinal section through a bearing showing another embodiment of our invention, namely one in which the shaft itself is equipped with a pair of spaced grooves.

Fig. 3 is a section through an embodiment similar to that of Fig. 1 but employing two spring-pressed sleeves for automatically adjusting the pressure on the packing, and having the shaft equipped with a collar of T-shaped cross-section.

In the drawings, Fig. 1 shows a portion of an air compressor of the general type disclosed in our copending application No. 469,110 as filed May 13, 1921, this being a compressor of the piston type in which the crank casing is sealed to prevent the escape from this casing of gas which has leaked past the piston. When a compressor of this type is used for effecting a considerable compression, the pressure within the crank casing is apt to rise considerably above that of the atmosphere. Consequently, the resulting difference in pressure will tend to cause a leakage of gas from the crank chamber along the shaft to the outer air. Such leakage will mean a corresponding loss of the energy required for compressing the gas which is thus wasted, as well as the loss of the leaking amount of gas. If the compressor is part of a refrigerating system, the resulting leakage will not only mean a corresponding reduction in the gaseous charge of the system but may also lead to serious results in case the compressor is employed in connection with carbon dioxide, sulphur dioxide or the like.

To prevent such leakage, it has heretofore been customary to employ some sort of a stuffing box in connection with the shaft, the idea being to compact the packing material within the stuffing box so tightly against the shaft as to afford a seal. In practice, such a tightness of packing cannot readily be obtained even at the start without exerting an amount of pressure on the shaft which will cause undue friction and which will therefore increase the amount of power required for rotating the shaft. Moreover, the continued vibration to which such a shaft is subjected while in operation, particularly in a machine in which the shaft is rotated by a reciprocating pitman, tends to jar the packing away from the shaft and to compress this packing to a substantially oval bore, thereby affording openings adjacent to the shaft through which gas can easily leak. Furthermore, any compact construction of such a machine will involve a stuffing box of relatively short length, thus making it impractical to provide packing along the shaft for such a length as will materially retard the leakage along an uninterrupted cylindrical surface of the shaft.

To overcome these objections, our invention aims to provide spring-actuated means continuously pressing portions of the packing towards the axis of the shaft, aims to provide simple means for interrupting the directness of the passage through which possible leakage can occur along the surface of the shaft, and aims to arrange the spring means in such a manner as to force the packing against shoulders or bends thus introduced in the possible leakage path. Furthermore, our invention aims to provide simple means for avoiding the production of undesirable end pressure, through the use of our invention, and also aims to employ portions of a regular shaft bearing as one element for accomplishing the above named objects.

In the compressor of which portion is shown in Fig. 1, the reciprocating piston 1 is connected by a pitman 2 with a crank 3 secured to one end of a shaft 4 and this shaft extends through the end plate 5 of the crank casing. This end plate supports two bearings for the shaft 4, one of these bearings being formed by an inwardly directed tubular projection 6 on the said end plate and being directly engaged by the hub 7 of the crank. The other bearing is formed by a bushing 8 threaded into the outer end of the bearing tube 9 of which the said part 6 forms an inward extension.

With the parts thus arranged, it will be obvious that as soon as leakage of the compressed gas past the piston 1 into the interior of the crank casing has raised the pressure within this casing, this pressure will tend to force a leakage of gas longitudinally along the shaft to the outer air. To retard such a leakage, we employ part of the tube 9 as the casing of a stuffing box for housing a compressible packing 10, and we employ spring-actuated means for keeping the packing pressed against the shaft. With this in mind, we desirably provide the inner end of the bearing bushing 8 with a flaring mouth engaging the outer end of the packing, and provide an oppositely directed flaring mouth on a follower 11 which is slidably mounted on the shaft 4 and which is continuously pressed towards the bushing 8 by a spiral spring 12, the other end of the said spring being in engagement with a collar 13 held in place by a set screw 14.

Thus arranged, the compression spring 12 will tend to move the follower 11 towards to the bushing 8 so as to compensate for wear on the packing and for the gradual compacting of this packing when in service, while the frusto-conical mouths of the bushing 8 and the sleeve 11 will continuously tend to force the packing inwardly of the shaft. However, the up-and-down vibration due to the reciprocating piston and pitman arrangement will tend to change the bore of the packing from a cylindrical to an oval shape which would afford direct leakage paths along the upper and lower edges of the shaft. To avoid this, we equip the shaft with means for interrupting such direct leakage paths and for compelling any possible leakage to follow a tortuous path which will greatly retard and lessen the resulting leakage. For this purpose we are here showing the shaft 4 as having a collar 15 shrunk upon it, this collar being of rectangular cross-section longitudinally of the shaft and being mounted on the shaft substantially midway between the tapering mouths of the bushing 8 and the follower 11. The taper of these two opposed mouths will cause each of them to afford a cam or wedging action, so that the pressure exerted by the spring 12 on the follower 11 longitudinally of the shaft will be resolved partly into pressure tending to force the packing against the juncture of the shaft with the opposite sides of the collar 15. Consequently, the packing will be maintained in tight engagement with this collar and vibrations transverse of the shaft will not interrupt the firm engagement of the packing with the opposite faces of the collar 15. Thus arranged, this collar not only interrupts the direct leakage path along the surface of the shaft by compelling any possible leakage to follow a path over the outside of this collar, but also maintains a tight closure along both faces of the collar and hence permits us to maintain a substantially tight sealing of the crank casing in spite of the vibrations imparted to the shaft by the piston and the connection between the piston and the shaft.

In practice, the packing can readily be inserted in substantially equal quantities on opposite sides of the collar 15, this packing being desirably in the form of disks bored to fit the shaft 4, each disk 10 being built of laminations which extend transverse of the shaft and which tend to interrupt leakage along lines longitudinal of the shaft the disks each being radially slit to allow same to be engaged over the shaft. With the packing thus symmetrically distributed with respect to the collar 15, the heretofore described pressure of the packing against the two faces of the collar 15 will afford a balance so as to avoid the producing of end thrusts upon the shaft by our packing arrangement. However, if the packing is gradually compressed when in service, the approaching of the follower 11 to the bushing 8 will tend to cause a corresponding movement of the collar 15 and hence will produce an end thrust on the shaft which may be undesirable. To avoid this, we may interpose a packing gasket 16 between the outer end of the bearing tube 9 and the head of the bushing 8. By removing this bushing and substituting a thinner gasket, we can compensate for any effected movement between the follower 11 and the said bushing so as to make up for the tendency towards producing an end thrust on the shaft.

In practice, the oppositely directed faces of the collar 15 are desirably at right angles to the axis of the shaft, so that any vibration of the latter merely slides the collar 15 between substantially parallel face portions of the packing, thereby permitting even a quite light spring 12 to maintain the packing effectively tight. However, while we have heretofore described our invention in a highly desirable embodiment, we do not wish to be limited to the aforesaid collar construction or bushing adjustment, nor to other details of the construction and arrangement, as the same might obviously be varied in many ways without departing from the spirit of our invention.

For example, instead of constructing the packing-engaging collar 15 of a separate piece from the shaft 4 and shrinking this collar tightly on the shaft, we may employ a collar formed integral with the shaft. This is easily accomplished after the manner of Fig. 2 for purposes where a reduction in the strength of the shaft is not objectionable, namely by turning upon the shaft a couple of grooves spaced longitudinally of the shaft by a shaft portion 17 located substantially centrally of the packing. So also, instead of making one of the cup-shaped packing-engaging members integral with the bushing 8, we may employ an outer follower 18 having a tapering mouth engaging the packing and may use the bearing bushing 19 for resisting the thrust on the follower 18 longitudinally of the shaft. Moreover, we do not wish to be limited to the use of collars of a simple cross-section, nor to the use of a one-sided spring arrangement for maintaining the packing in its desirable operative disposition. Thus, Fig. 3 shows an embodiment of our invention in which the collar 20 has a substantially T-shaped cross-section which will cause any leaking gas to follow a still more tortuous path, and in which an approaching of the followers 11 and 18 is effected by compression springs 12 and 22 respectively engaging the oppositely directed ends of the said follower.

So also, we do not wish to be limited in the employment of our invention to gas compressors, it being obvious that our novel collared shaft and stuffing box arrangement might be equally suited for other purposes where leakage of a fluid of any kind along a rotating or oscillating shaft is to be prevented or at least retarded.

We claim as our invention:

1. In combination with a stuffing box, a shaft, a collar mounted thereon, a pair of members both sleeved upon the shaft and movable with respect to each other and each having a flaring end confronting the collar, a pair of packing disks respectively contacting opposite faces of the collar and extending from the shaft to the walls of the stuffing box, loose compressible packing disposed between the two disks radially outward of the collar, loose compressible packing between each of the disks and the said flaring ends of said members facing the sides of the collar on which the respective disks are disposed, and spring means for compressing the said packing.

2. In combination with a stuffing box, a shaft having a collar thereon and having a pair of circumferential grooves disposed on opposite sides of said collar, two relatively movable members fitting portions of the shaft and disposed outwardly beyond the groove and each having a conically flaring end confronting the collar, a pair of packing disks respectively bearing against opposite faces of the collar, compressible packing disposed between the two disks, compressible packing between each disk and the member adjacent thereto, and spring means continuously urging one of the said members towards the other.

3. A shaft and stuffing box combination as per claim 2, in which one of the said members is slidable, and wherein each of the packing disks has a diameter corresponding substantially to the bore of the casing.

4. A shaft and stuffing box combination as per claim 2, in which one of the said members is slidable, and wherein each of the packing disks has a diameter corresponding substantially to the bore of the stuffing box and is composed of laminations extending transversely of the shaft.

Signed at Chicago, Illinois, June 4th, 1921.

CHARLES C. HANSON.
JOHN TWARDOWSKY.